(12) United States Patent
Ichikawa (10) Patent No.: US 8,798,826 B2
(45) Date of Patent: Aug. 5, 2014

(54) POWER SUPPLY SYSTEM, VEHICLE INCLUDING THE SAME, CONTROL METHOD FOR POWER SUPPLY SYSTEM, AND COMPUTER-READABLE RECORDING MEDIUM RECORDING PROGRAM FOR CAUSING COMPUTER TO EXECUTE THE CONTROL METHOD

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 773 days.

(21) Appl. No.: 12/451,212

(22) PCT Filed: May 26, 2008

(86) PCT No.: PCT/JP2008/060102
§ 371 (c)(1),
(2), (4) Date: Oct. 30, 2009

(87) PCT Pub. No.: WO2008/149826
PCT Pub. Date: Dec. 11, 2008

(65) Prior Publication Data
US 2010/0131136 A1    May 27, 2010

(30) Foreign Application Priority Data
Jun. 6, 2007 (JP) ................. 2007-150711

(51) Int. Cl.
*H02P 21/00* (2006.01)

(52) U.S. Cl.
USPC ............. 701/22; 388/806; 388/804; 318/375; 318/376; 318/798; 318/801; 318/815

(58) Field of Classification Search
CPC ............. Y02T 10/7005; Y02T 10/642; Y02T 10/7044; B60K 6/46; B60K 6/48; B60K 6/543; B60L 11/1803; B60L 11/1861; B60L 11/1862; B60L 15/2045; B60L 2260/54; B60W 10/08; B60W 20/00; B60W 2510/244; H02P 2201/07; H02P 27/06; H02P 27/14
USPC ........... 701/101, 22; 363/62, 60, 89; 318/375, 318/376, 798, 801, 815; 180/65.245, 65.25, 180/65.27, 65.28, 65.285; 323/283, 284; 477/3

See application file for complete search history.

(56) References Cited

U.S. PATENT DOCUMENTS 7,133,602 B2 * 11/2006 Yamada ................. 388/806
2002/0062183 A1 * 5/2002 Yamaguchi et al. ........... 701/22
(Continued)

FOREIGN PATENT DOCUMENTS

| JP | A-2002-010502 | 1/2002 |
| JP | A-2003-209969 | 7/2003 |

(Continued)

OTHER PUBLICATIONS

International Search Report dated Sep. 2, 2008.

*Primary Examiner* — Adam Tissot
(74) *Attorney, Agent, or Firm* — Oliff PLC (57) ABSTRACT

A lower limit value setting unit (52) variably sets a lower limit value (Vth) of a target voltage (Vh*) in a range of a voltage that is higher than the maximum value of voltages (Vb1, Vb2) of power storage devices and is not affected by a dead time provided for converters, based on temperatures (Tb1, Tb2) and required electric powers (Pb1*, Pb2*). A maximum value selection unit (53) sets the maximum value among the voltages (Vb1, Vb2) of the power storage devices and required voltages (Vm1*, Vm2*) of motor-generators, as the target voltage. A target voltage limiting unit (54) compares the target voltage with the lower limit value (Vth), and if the target voltage is lower than the lower limit value (Vth), the target voltage limiting unit (54) sets the lower limit value (Vth) as the target voltage (Vh*).

17 Claims, 7 Drawing Sheets

(56) References Cited

U.S. PATENT DOCUMENTS

2003/0107352 A1 6/2003 Downer et al.
2004/0165868 A1* 8/2004 Sato et al. .................... 388/804
2007/0165432 A1 7/2007 Okamura et al.

FOREIGN PATENT DOCUMENTS

| JP | A-2005-051895 | 2/2005 |
| JP | A-2007-295701 | 11/2007 |
| WO | WO 2005/013467 A1 | 2/2005 |

* cited by examiner

POWER SUPPLY SYSTEM, VEHICLE INCLUDING THE SAME, CONTROL METHOD FOR POWER SUPPLY SYSTEM, AND COMPUTER-READABLE RECORDING MEDIUM RECORDING PROGRAM FOR CAUSING COMPUTER TO EXECUTE THE CONTROL METHOD

TECHNICAL FIELD

The present invention relates to a power supply system including a plurality of power storage devices, a vehicle including the same, a control method for a power supply system including a plurality of power storage devices, and a computer-readable recording medium recording a program for causing a computer to execute the control method.

BACKGROUND ART

In recent years, in vehicles equipped with electric motors as a motive power source such as hybrid vehicles and electric vehicles, the capacity of a power storage unit has been being increased to improve acceleration performance and running performance such as a maximum traveling distance. As means for increasing the capacity of a power storage unit, a configuration having a plurality of power storage devices has been proposed.

For example, Japanese Patent Laying-Open No. 2003-209969 discloses a power supply control system including a plurality of power stages. The power supply control system includes a plurality of power stages connected in parallel with one another and supplying direct current (DC) power to at least one inverter. Each power stage includes a battery and a boost/buck DC-DC converter.

In the power supply control system, the plurality of power stages are controlled to maintain an output voltage to the inverter by uniformly charging/discharging the batteries respectively included in the plurality of power stages.

Typically, in a boost/buck DC-DC converter as disclosed in Japanese Patent Laying-Open No. 2003-209969 described above, a dead time allowing for a switch turn-off delay time is provided to prevent a short circuit caused by simultaneous turning-on of a boost switch and a buck switch. When the boost/buck DC-DC converter has a low boost ratio, the output voltage vibrates under the influence of the dead time.

Accordingly, it is conceivable to always keep the buck switch ON when the boost ratio is low. However, if the buck switch is always kept ON in a configuration including a plurality of power stages as in the power supply control system disclosed in the publication described above, a short circuit occurs between the batteries, and an uncontrollable current flows between the batteries.

DISCLOSURE OF THE INVENTION

Therefore, the present invention has been made to solve such a problem, and one object of the present invention is to prevent voltage fluctuations due to the influence of a dead time provided for converters in a power supply system including a plurality of power storage devices.

According to the present invention, provided is a power supply system capable of supplying/receiving electric power to/from a load device, including a plurality of power storage devices that are chargeable/dischargeable, a power line, a plurality of converters, a target voltage setting unit, and a voltage control unit. The power line is provided for supplying/receiving the electric power between the power supply system and the load device. The plurality of converters are provided corresponding to the plurality of power storage devices, and each converter is configured to be capable of performing voltage conversion between the corresponding power storage device and the power line. The target voltage setting unit sets a target voltage of the power line. The voltage control unit controls a voltage of the power line to be the target voltage by controlling at least one of the plurality of converters. If the target voltage is lower than a target voltage lower limit value that is set higher than a maximum one of voltages of the plurality of power storage devices, the target voltage setting unit sets the target voltage lower limit value as the target voltage.

Preferably, the target voltage setting unit sets a maximum one of the voltages of the plurality of power storage devices and a required voltage of the load device as the target voltage, and, if the set target voltage is lower than the target voltage lower limit value, the target voltage setting unit sets the target voltage lower limit value as the target voltage.

Preferably, the target voltage lower limit value is set to a voltage that is not affected by a dead time provided to prevent a short circuit in upper and lower arms of the plurality of converters.

Preferably, the target voltage lower limit value is variably set in accordance with states of the plurality of power storage devices.

More preferably, the target voltage lower limit value is set to be higher with a decrease in temperatures of the plurality of power storage devices.

More preferably, the target voltage lower limit value is set to be higher with an increase in charge power to the plurality of power storage devices.

More preferably, the target voltage lower limit value is set to be higher with an increase in charge current to the plurality of power storage devices.

More preferably, the target voltage lower limit value is set to be higher with an increase in state quantity indicating a state of charge of the plurality of power storage devices.

Further, according to the present invention, provided is a vehicle including any power supply system described above and a drive force generation unit. The drive force generation unit receives the electric power supplied from the power supply system and generates drive force for the vehicle.

Further, according to the present invention, provided is a control method for a power supply system capable of supplying/receiving electric power to/from a load device. The power supply system includes a plurality of power storage devices that are chargeable/dischargeable, a power line, and a plurality of converters. The power line is provided for supplying/receiving the electric power between the power supply system and the load device. The plurality of converters are provided corresponding to the plurality of power storage devices, and each converter is configured to be capable of performing voltage conversion between the corresponding power storage device and the power line. The control method includes the steps of setting a target voltage of the power line, determining whether or not the target voltage is lower than a target voltage lower limit value that is set higher than a maximum one of voltages of the plurality of power storage devices, setting the target voltage lower limit value as the target voltage if the target voltage is determined to be lower than the target voltage lower limit value, and controlling a voltage of the power line to be the target voltage by controlling at least one of the plurality of converters.

Preferably, in the step of setting a target voltage, a maximum one of the voltages of the plurality of power storage devices and a required voltage of the load device is set as the target voltage.

Preferably, the target voltage lower limit value is set to a voltage that is not affected by a dead time provided to prevent a short circuit in upper and lower arms of the plurality of converters.

Preferably, the target voltage lower limit value is variably set in accordance with states of the plurality of power storage devices.

More preferably, the target voltage lower limit value is set to be higher with a decrease in temperatures of the plurality of power storage devices.

More preferably, the target voltage lower limit value is set to be higher with an increase in charge power to the plurality of power storage devices.

More preferably, the target voltage lower limit value is set to be higher with an increase in charge current to the plurality of power storage devices.

More preferably, the target voltage lower limit value is set to be higher with an increase in state quantity indicating a state of charge of the plurality of power storage devices.

Further, according to the present invention, provided is a computer-readable recording medium recording a program for causing a computer to execute any control method described above.

As described above, in the present invention, a plurality of converters are provided corresponding to a plurality of power storage devices, and connected in parallel to a power line. A target voltage lower limit value is provided for a target voltage of the power line, and the target voltage lower limit value is set higher than a maximum one of voltages of the power storage devices. If the target voltage is lower than the target voltage lower limit value, the target voltage lower limit value is set as the target voltage, avoiding low boost operation that causes the target voltage to be substantially identical to the voltages of the power storage devices.

Therefore, according to the present invention, voltage fluctuations due to the influence of a dead time provided for converters can be prevented.

BEST MODES FOR CARRYING OUT THE INVENTION

Hereinafter, an embodiment of the present invention will be described in detail with reference to the drawings, in which identical or corresponding parts will be designated by the same reference numerals, and the description thereof will not be repeated.

Figure 1:
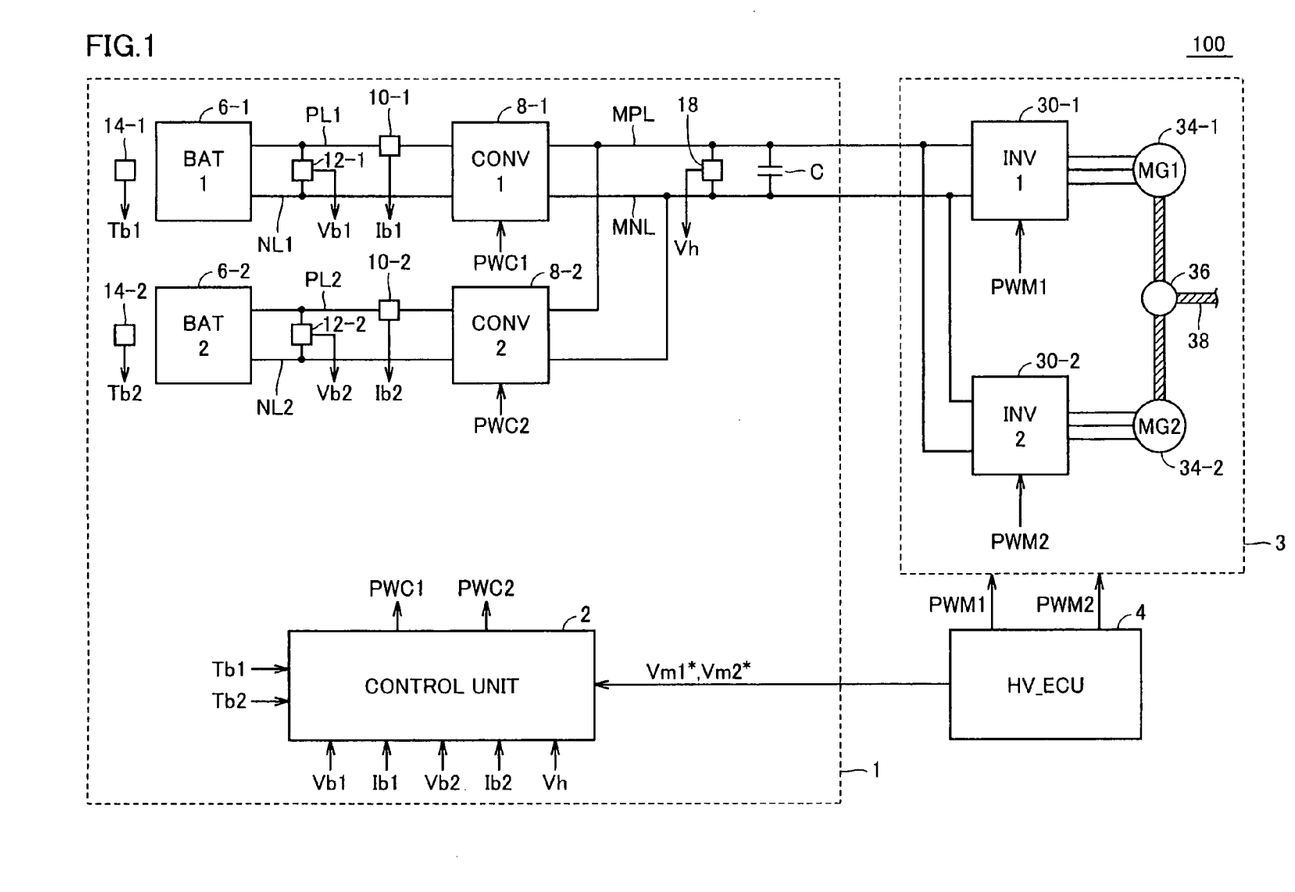
FIG. 1 is an overall block diagram of a vehicle in accordance with an embodiment of the present invention.

FIG. 1 is an overall block diagram of a vehicle in accordance with an embodiment of the present invention. Referring to FIG. 1, a vehicle 100 includes a power supply system 1, a drive force generation unit 3, and an HV_ECU (Hybrid Vehicle Electronic Control Unit) 4.

Drive force generation unit 3 includes inverters 30-1, 30-2, motor-generators 34-1, 34-2, a motive power transfer mechanism 36, and a drive shaft 38. Inverters 30-1, 30-2 are connected in parallel to a main positive bus line MPL and a main negative bus line MNL. Inverters 30-1, 30-2 receive DC power supplied from power supply system 1, and drives motor-generators 34-1, 34-2, respectively. Further, inverters 30-1, 30-2 convert alternate current (AC) power generated by motor-generators 34-1, 34-2 into DC power, respectively, and output the DC power to power supply system 1, as regenerative power.

Inverters 30-1, 30-2 are each formed of, for example, a bridge circuit including switching elements for three phases. Inverters 30-1, 30-2 drive the corresponding motor generators by performing a switching operation in response to respective drive signals PWM1, PWM2 from HV_ECU 4.

Motor-generators 34-1, 34-2 generate rotational drive force by receiving AC power supplied from inverters 30-1, 30-2, respectively. Motor-generators 34-1, 34-2 also generate electric power by receiving external rotational force. Motor-generators 34-1, 34-2 are each formed of, for example, a three-phase AC electric rotating machine including a rotor having permanent magnets embedded therein. Motor-generators 34-1, 34-2 are coupled to motive power transfer mechanism 36, and the rotational drive force is transferred to wheels (not shown) via drive shaft 38 further coupled to motive power transfer mechanism 36.

If drive force generation unit 3 is applied to a hybrid vehicle, motor-generators 34-1, 34-2 are also coupled to an engine (not shown) via motive power transfer mechanism 36 or drive shaft 38. Then, HV_ECU 4 performs control to obtain an optimal ratio between the drive force generated by the engine and the drive force generated by motor-generators 34-1, 34-2. If drive force generation unit 3 is applied to such a hybrid vehicle, one of motor-generators 34-1, 34-2 may serve exclusively as an electric motor, and the other motor-generator may serve exclusively as a generator.

HV_ECU 4 calculates required torques of motor-generators 34-1, 34-2 based on a signal transmitted from each sensor (not shown), a running situation, an accelerator pedal position, and the like, and calculates required voltages Vm1*, Vm2* of motor-generators 34-1, 34-2 based on the calculated required torques. Then, HV_ECU 4 generates drive signals PWM1, PWM2 based on the calculated required voltages Vm1*, Vm2*, respectively, and outputs the generated drive signals PWM1, PWM2 to inverters 30-1, 30-2, respectively. Further, HV_ECU 4 outputs the calculated required voltages Vm1*, Vm2* to power supply system 1.

Power supply system 1 includes power storage devices 6-1, 6-2, converters 8-1, 8-2, a smoothing capacitor C, a control unit 2, current sensors 10-1, 10-2, voltage sensors 12-1, 12-2, 18, and temperature sensors 14-1, 14-2.

Power storage devices 6-1, 6-2 are chargeable/dischargeable DC power supplies, and are each formed for example of a secondary battery such as a nickel hydride battery or a lithium ion battery. Power storage device 6-1 is connected to converter 8-1 via a positive electrode line PL1 and a negative electrode line NL1, and power storage device 6-2 is connected to converter 8-2 via a positive electrode line PL2 and a negative electrode line NL2. It is to be noted that at least one of power storage devices 6-1, 6-2 may be implemented by an electric double layer capacitor.

Converter 8-1 is provided between power storage device 6-1 and the pair of main positive bus line MPL and main negative bus line MNL, and performs voltage conversion between power storage device 6-1 and the pair of main positive bus line MPL and main negative bus line MNL in response to a drive signal PWC1 from control unit 2. Converter 8-2 is provided between power storage device 6-2 and the pair of main positive bus line MPL and main negative bus line MNL, and performs voltage conversion between power storage device 6-2 and the pair of main positive bus line MPL and main negative bus line MNL in response to a drive signal PWC2 from control unit 2.

Smoothing capacitor C is connected between main positive bus line MPL and main negative bus line MNL, and reduces an electric power fluctuation component contained in main positive bus line MPL and main negative bus line MNL. Voltage sensor 18 detects a voltage Vh between main positive bus line MPL and main negative bus line MNL, and outputs the detected value to control unit 2.

Current sensors 10-1, 10-2 detect a current Ib1 input to/output from power storage device 6-1 and a current Ib2 input to/output from power storage device 6-2, respectively, and output the detected values to control unit 2. Current sensors 10-1, 10-2 each detect a current output from the corresponding power storage device (a discharge current) as a positive value, and detect a current input to the corresponding power storage device (a charge current) as a negative value. Although the drawing shows a case where current sensors 10-1, 10-2 detect current values of positive electrode lines PL1, PL2, respectively, current sensors 10-1, 10-2 may detect currents of negative electrode lines NL1, NL2, respectively.

Voltage sensors 12-1, 12-2 detect a voltage Vb1 of power storage device 6-1 and a voltage Vb2 of power storage device 6-2, respectively, and output the detected values to control unit 2. Temperature sensors 14-1, 14-2 detect a temperature Tb1 inside power storage device 6-1 and a temperature Tb2 inside power storage device 6-2, respectively, and output the detected values to control unit 2.

Control unit 2 generates drive signals PWC1, PWC2 in accordance with a control structure described later, based on required voltages Vm1\*, Vm2\* of motor-generators 34-1, 34-2 received from HV_ECU 4 and the detected values of voltages Vb1, Vb2 from voltage sensors 12-1, 12-2, voltage Vh from voltage sensor 18, currents Ib1, Ib2 from current sensors 10-1, 10-2, and temperatures Tb1, Tb2 from temperature sensors 14-1, 14-2, and outputs the generated drive signals PWC1, PWC2 to converters 8-1, 8-2, respectively.

More specifically, control unit 2 sets a target voltage Vh\* of voltage Vh, and generates drive signal PWC1 such that voltage Vh matches target voltage Vh\*. On this occasion, control unit 2 sets the maximum value among voltages Vb1, Vb2 and required voltages Vm1\*, Vm2\* as target voltage Vh\*, and if target voltage Vh\* is lower than a prescribed lower limit value Vth, control unit 2 sets lower limit value Vth as target voltage Vh\*.

Further, on this occasion, lower limit value Vth of target voltage Vh\* is set at a voltage level that is higher than voltages Vb1, Vb2 and is not affected by a dead time provided for converters 8-1, 8-2. The reason for providing such lower limit value Vth for target voltage Vh\* is that, if target voltage Vh\* is low and the converters have a low boost ratio, an output voltage (voltage Vh) of the converters vibrates under the influence of the dead time when the converters perform switching control.

Further, lower limit value Vth is variably set in accordance with temperatures Tb1, Tb2 and required electric powers Pb1\*, Pb2\* of power storage devices 6-1, 6-2. The reason for variably setting lower limit value Vth as described above is that, if lower limit value Vth is set to a constant high value, losses in converters 8-1, 8-2 are increased, and the voltages of the power storage devices are changed in accordance with the temperatures and the input/output electric powers (currents) of the power storage devices.

Required electric powers Pb1\*, Pb2\* of power storage devices 6-1, 6-2 are determined based on the states of charge (SOC) of power storage devices 6-1, 6-2, respectively. Specifically, if a state quantity SOC1 (SOC2) indicating the SOC of power storage device 6-1 (6-2) is lower than a control target value or a control target range, required electric power Pb1\* (Pb2\*) is determined such that power storage device 6-1 (6-2) is charged in a prescribed charge amount (in this case, the required electric power has a negative value), and if state quantity SOC1 (SOC2) is higher than the control target value or the control target range, required electric power Pb1\* (Pb2\*) is determined such that power storage device 6-1 (6-2) is discharged in a prescribed discharge amount (in this case, the required electric power has a positive value).

Besides setting target voltage Vh\* and generating drive signal PWC1 for converter 8-1 such that voltage Vh matches target voltage Vh\* as described above, control unit 2 calculates a target current Ib2\* of converter 8-2 based on required electric power Pb2\* and voltage Vb2 of power storage device 6-2, and generates drive signal PWC2 for converter 8-2 such that current Ib2 matches target current Ib2\*.

Figure 2:
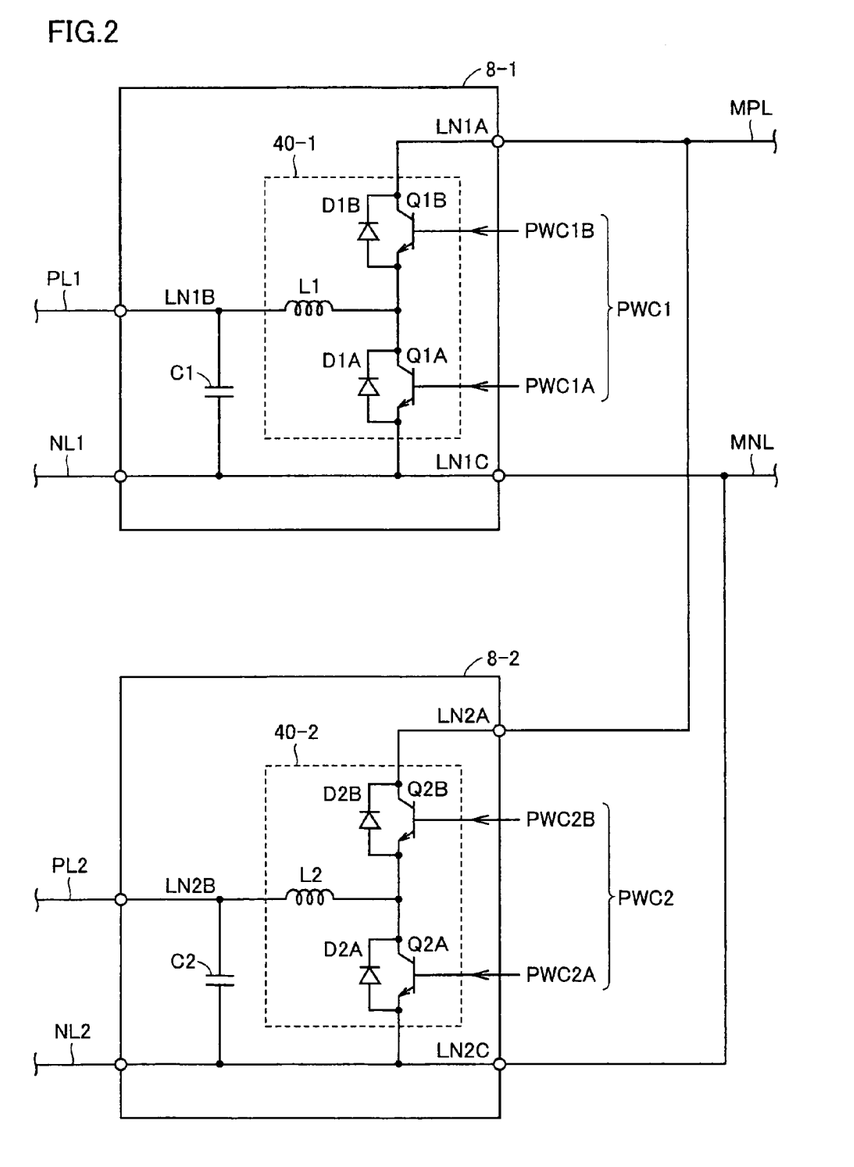
FIG. 2 is a schematic configuration diagram of converters shown in FIG. 1.

FIG. 2 is a schematic configuration diagram of converters 8-1, 8-2 shown in FIG. 1. Since the configuration and the operation of converter 8-2 are the same as those of converter 8-1, the configuration and the operation of converter 8-1 will be described below. Referring to FIG. 2, converter 8-1 includes a chopper circuit 40-1, a positive bus line LN1A, a negative bus line LN1C, a line LN1B, and a smoothing capacitor C1. Chopper circuit 40-1 includes transistors Q1A, Q1B, diodes D1A, D1B, and an inductor L1.

Positive bus line LN1A has one end connected to a collector of transistor Q1B and the other end connected to main positive bus line MPL. Negative bus line LN1C has one end connected to negative electrode line NL1 and the other end connected to main negative bus line MNL.

Transistors Q1A and Q1B are connected in series between negative bus line LN1C and positive bus line LN1A. Specifically, an emitter of transistor Q1A is connected to negative bus line LN1C, and the collector of transistor Q1B is connected to positive bus line LN1A. Diodes D1A, D1B are connected in antiparallel with transistors Q1A, Q1B, respectively. Inductor L1 is connected to a connection node of transistor Q1A and transistor Q1B.

Line LN1B has one end connected to positive electrode line PL1 and the other end connected to inductor L1. Smoothing capacitor C1 is connected between line LN1B and negative bus line LN1C, and reduces AC component contained in DC voltage between line LN1B and negative bus line LN1C.

In response to drive signal PWC1 from control unit 2 (not shown), chopper circuit 40-1 can boost DC power (drive power) received from positive electrode line PL1 and negative electrode line NL1 to supply the boosted DC power to main positive bus line MPL and main negative bus line MNL, and can buck the voltage of main positive bus line MPL and main negative bus line MNL to supply the bucked voltage to power storage device 6-1.

Hereinafter, the voltage conversion operation (boost operation) of converter 8-1 will be described. Control unit 2 maintains transistor Q1B in an OFF state, and turns on/off transistor Q1A at a prescribed duty ratio. During an ON period of transistor Q1A, a discharge current flows from power storage device 6-1 to main positive bus line MPL, sequentially through line LN1B, inductor L1, diode D1B, and positive bus line LN1A. At the same time, a pump current flows from power storage device 6-1, sequentially through line LN1B, inductor L1, transistor Q1A, and negative bus line LN1C. Inductor L1 accumulates electromagnetic energy by means of the pump current. Subsequently, when transistor Q1A makes transition from an ON state to an OFF state, inductor L1 superimposes the accumulated electromagnetic energy onto the discharge current. As a result, an average voltage of DC power supplied from converter 8-1 to main positive bus line MPL and main negative bus line MNL is boosted by a voltage corresponding to the electromagnetic energy accumulated in inductor L1 in accordance with the duty ratio.

To control such a voltage conversion operation of converter 8-1, control unit 2 generates drive signal PWC1 consisting of a drive signal PWC1A for controlling on/off of transistor Q1A and a drive signal PWC1B for controlling on/off of transistor Q1B.

Figure 3:
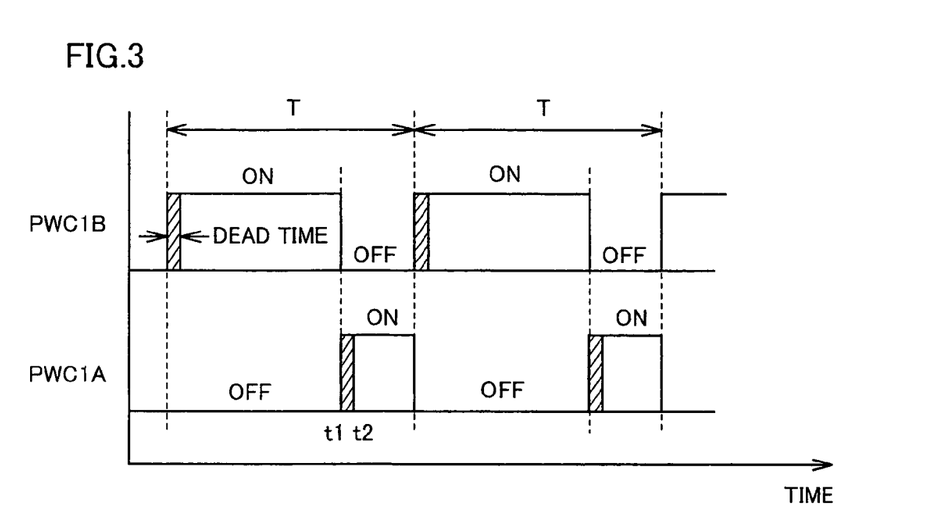
FIG. 3 is a view for illustrating a dead time provided for the converters shown in FIG. 2.

FIG. 3 is a view for illustrating the dead time provided for converters 8-1, 8-2 shown in FIG. 2. Although FIG. 3 representatively shows a timing chart of drive signals PWC1A, PWC1B driving a lower arm (transistor Q1A) and an upper arm (transistor Q1B) of converter 8-1, respectively, the same applies to converter 8-2.

Referring to FIG. 3, in each control cycle T, transistors Q1A, Q1B are turned on/off at a prescribed duty ratio. If upper arm transistor Q1B is ON until a timing t1 and lower arm transistor Q1A is OFF until timing t1, and thereafter transistor Q1A is turned on and transistor Q1B is turned off at timing t1, there is a possibility that transistors Q1A, Q1B may be simultaneously turned on. Accordingly, it is configured that upper arm transistor Q1B is turned off at timing t1, and, after a lapse of a given dead time, lower arm transistor Q1A is turned on at a timing t2.

If target voltage Vh* of voltage Vh is very close to voltages Vb1, Vb2 of power storage devices 6-1, 6-2, on-duty of upper arm transistor Q1B (meaning a period for which the upper arm is ON) is close to 1. In that case, on-duty of lower arm transistor Q1A is shortened by the dead time, and thus it is impossible to secure a period for which transistor Q1A should be ON.

It is also conceivable to always keep the upper arm of the converter ON when target voltage Vh* of voltage Vh is very close to voltages Vb1, Vb2 of power storage devices 6-1, 6-2. However, if the upper arm of the converter is always kept ON, power storage devices 6-1, 6-2 are short-circuited, and an uncontrollable current flows between power storage devices 6-1 and 6-2.

Therefore, in the present embodiment, lower limit value Vth is provided for target voltage Vh*, and lower limit value Vth is set at the voltage level that is higher than voltages Vb1, Vb2 and is not affected by the dead time. Further, since losses in converters 8-1, 8-2 are increased if lower limit value Vth is set to a constant high value, lower limit value Vth is variably set in the present embodiment to suppress a reduction in efficiency of converters 8-1, 8-2 as much as possible.

Since the dead time provided for converters 8-1, 8-2 is determined at a prescribed value based on the performance of the converters, on-duty (boost ratio) that is not affected by the dead time can be determined from the dead time and control cycle T. Then, the voltage level that is not affected by the dead time can be determined for target voltage Vh* based on the on-duty (boost ratio) that is not affected by the dead time.

Figure 4:
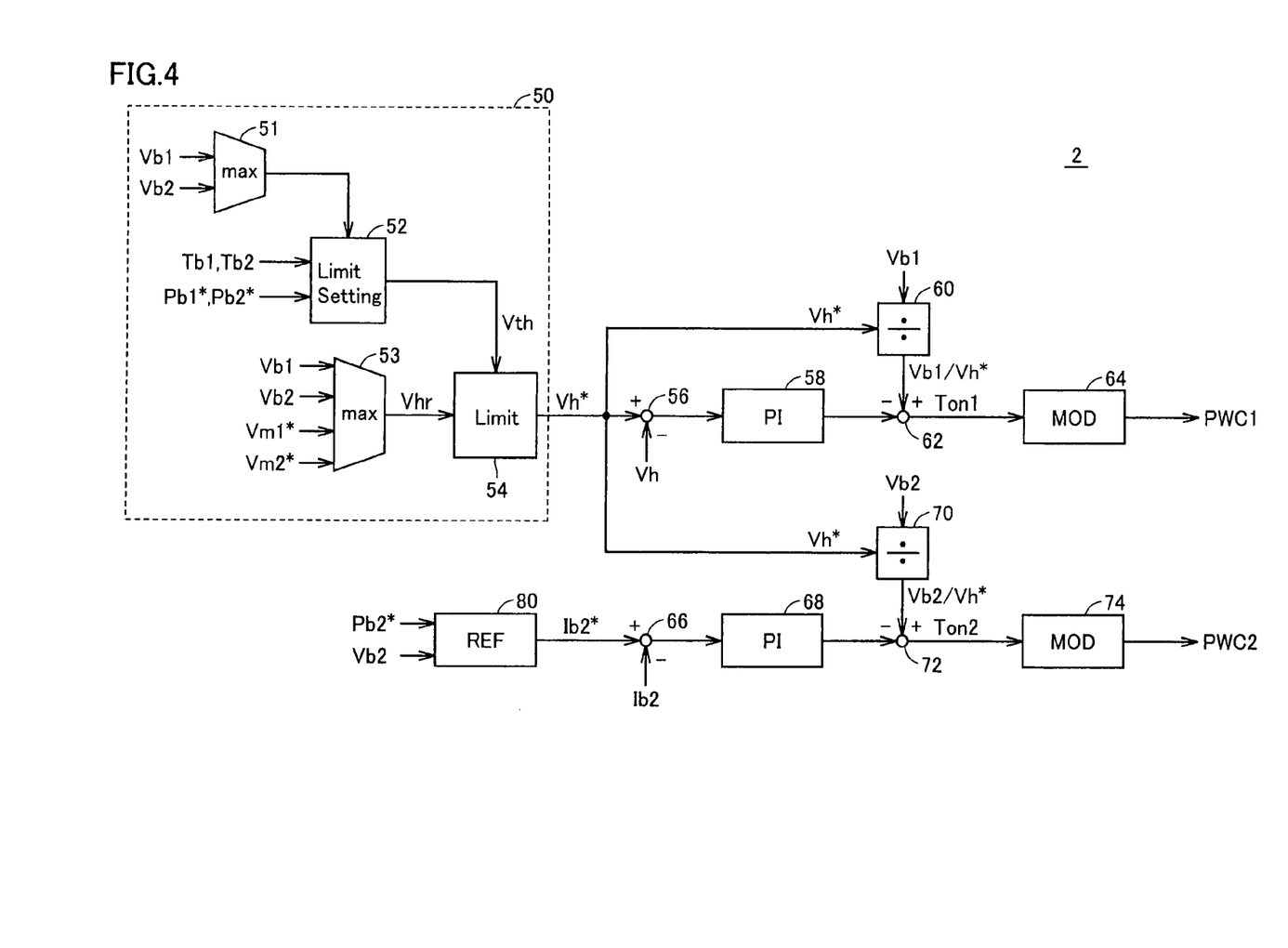
FIG. 4 is a functional block diagram of a control unit shown in FIG. 1.

FIG. 4 is a functional block diagram of control unit 2 shown in FIG. 1. Referring to FIG. 4, control unit 2 includes a target voltage setting unit 50, subtraction units 56, 62, 66, 72, proportional-integral control units 58, 68, division units 60, 70, modulation units 64, 74, and a target current calculation unit 80. Target voltage setting unit 50 includes maximum value selection units 51, 53, a lower limit value setting unit 52, and a target voltage limiting unit 54.

Maximum value selection unit 51 outputs the maximum value of voltages Vb1, Vb2 to lower limit value setting unit 52. Lower limit value setting unit 52 determines lower limit value Vth of target voltage Vh* based on temperatures Tb1, Tb2, required electric powers Pb1*, Pb2*, and an output from maximum value selection unit 51, and outputs the determined lower limit value Vth to target voltage limiting unit 54.

Specifically, lower limit value setting unit 52 variably sets lower limit value Vth in a range of a voltage that is higher than a voltage indicated by the output from maximum value selection unit 51 and is not affected by the dead time provided for the converters, based on temperatures Tb1, Tb2 and required electric powers Pb1*, Pb2*.

Figure 5:
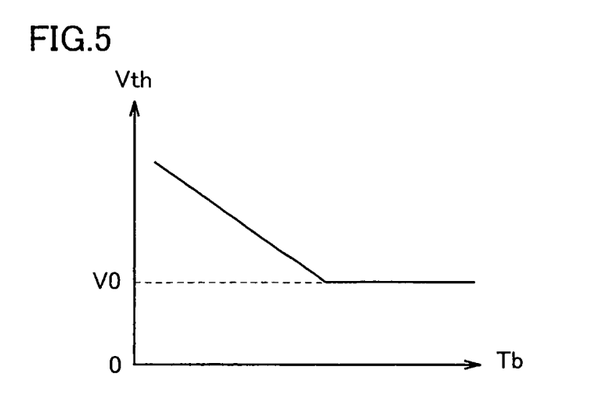
FIG. 5 is a view showing an exemplary relationship between the temperature of a power storage device and the lower limit value of a target voltage.

FIG. 5 is a view showing an exemplary relationship between the temperature of a power storage device and lower limit value Vth of target voltage Vh*. Referring to FIG. 5, lower limit value Vth is set to be higher with a decrease in the temperature of the power storage device. It is to be noted that lower limit value Vth is variably set in a range not less than a voltage V0 that is higher than the voltage of the power storage device and is not affected by the dead time.

Lower limit value Vth is variably set to be higher with a decrease in the temperature of the power storage device, for the following reason. The internal resistance of a power storage device varies depending on the temperature of the power storage device, and the internal resistance is increased with a decrease in temperature. Accordingly, even when the input/output current of the power storage device is constant, the voltage of the power storage device is increased with a decrease in the temperature of the power storage device. Therefore, lower limit value Vth is set to be higher corresponding to an increase in the voltage of the power storage device with a decrease in the temperature of the power storage device.

Figure 6:
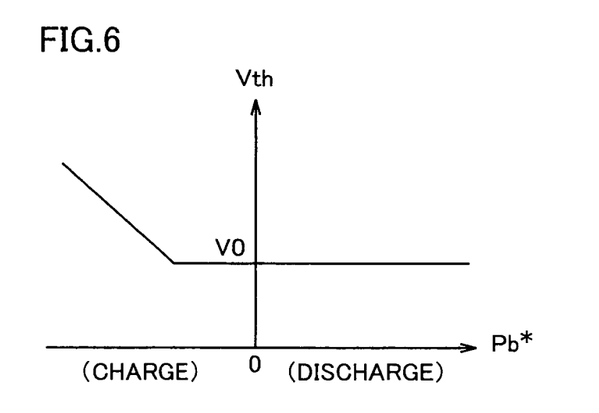
FIG. 6 is a view showing an exemplary relationship between the required electric power of a power storage device and the lower limit value of the target voltage.

FIG. 6 is a view showing an exemplary relationship between the required electric power of a power storage device and lower limit value Vth of target voltage Vh*. Referring to FIG. 6, lower limit value Vth is set to be higher with an increase in the required charge power of the power storage device. It is to be noted that lower limit value Vth is variably set in the range not less than voltage V0 described above.

Lower limit value Vth is variably set to be higher with an increase in the required charge power of the power storage device, for the following reason. The greater the charge current to the power storage device is, the greater the voltage of the power storage device is increased by the internal resistance, and the higher the voltage of the power storage device is. Therefore, lower limit value Vth is set to be higher corresponding to an increase in the voltage of the power storage device with an increase in the required charge power to the power storage device.

Referring again to FIG. 4, maximum value selection unit 53 outputs the maximum value among voltages Vb1, Vb2 and required voltages Vm1*, Vm2* of motor-generators 34-1, 34-2 to target voltage limiting unit 54, as a target voltage Vhr.

Target voltage limiting unit 54 compares target voltage Vhr from maximum value selection unit 53 with lower limit value Vth from lower limit value setting unit 52. If target voltage Vhr is lower than lower limit value Vth, target voltage limiting unit 54 outputs lower limit value Vth to subtraction unit 56, as target voltage Vh*. If target voltage Vhr is not less than lower limit value Vth, target voltage limiting unit 54 outputs target voltage Vhr to subtraction unit 56, as target voltage Vh*.

Subtraction unit 56 subtracts voltage Vh from target voltage Vh* output from target voltage setting unit 50, and outputs the computational result to proportional-integral control unit 58. Proportional-integral control unit 58 receives a deviation between target voltage Vh* and voltage Vh as an input, performs a proportional-integral computation, and then outputs the computational result to subtraction unit 62. It is to be noted that subtraction unit 56 and proportional-integral control unit 58 constitute a voltage feedback control element.

Division unit 60 divides voltage Vb1 by target voltage Vh*, and outputs the computational result to subtraction unit 62. (Voltage Vb1)/(target voltage Vh*), which is the computational result of division unit 60, is the reciprocal of a theoretical boost ratio of converter 8-1. Subtraction unit 62 subtracts an output of proportional-integral control unit 58 from an output of division unit 60, and outputs the computational result to modulation unit 64, as a duty command Ton1.

Modulation unit 64 generates drive signal PWC1 based on duty command Ton1 and a carrier wave generated by an oscillation unit not shown, and outputs the generated drive signal PWC1 to transistors Q1A, Q1B of converter 8-1.

It is to be noted that duty command Ton1 input to modulation unit 64 is equivalent to an on-duty ratio of transistor Q1B constituting the upper arm of converter 8-1, and has a value from 0 to 1. Converter 8-1 is controlled to have a lower boost ratio with an increase in duty command Ton1, and controlled to have a higher boost ratio with a decrease in duty command Ton1.

On the other hand, target current calculation unit 80 divides required electric power Pb2* of power storage device 6-2 determined based on state quantity SOC2 of power storage device 6-2, by voltage Vb2, and outputs the computational result to subtraction unit 66, as target current Ib2* of converter 8-2.

Subtraction unit 66 subtracts current Ib2 from target current Ib2* output from target current calculation unit 80, and outputs the computational result to proportional-integral control unit 68. Proportional-integral control unit 68 receives a deviation between target current Ib2* and current Ib2 as an input, performs a proportional-integral computation, and then outputs the computational result to subtraction unit 72. It is to be noted that subtraction unit 66 and proportional-integral control unit 68 constitute a current feedback control element.

Division unit 70 divides voltage Vb2 by target voltage Vh*, and outputs the computational result to subtraction unit 72. (Voltage Vb2)/(target voltage Vh*), which is the computational result of division unit 70, is the reciprocal of a theoretical boost ratio of converter 8-2. Subtraction unit 72 subtracts an output of proportional-integral control unit 68 from an output of division unit 70, and outputs the computational result to modulation unit 74, as a duty command Ton2.

Modulation unit 74 generates drive signal PWC2 based on duty command Ton2 and a carrier wave generated by an oscillation unit not shown, and outputs the generated drive signal PWC2 to transistors Q2A, Q2B of converter 8-2.

As described above, drive signal PWC1 for controlling converter 8-1 is generated by the control computation including the voltage feedback control element, and drive signal PWC2 for controlling converter 8-2 is generated by the control computation including the current feedback control element.

Figure 7:
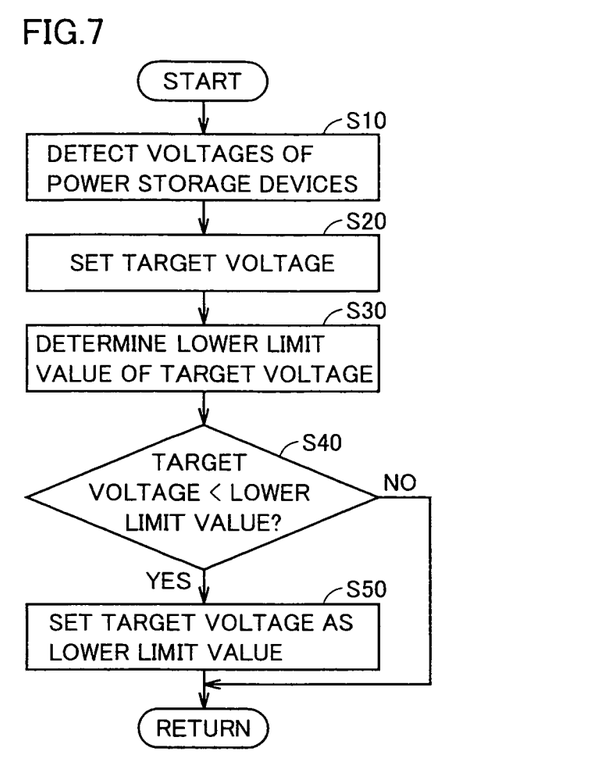
FIG. 7 is a flowchart for a process of setting the target voltage performed by the control unit shown in FIG. 1.

FIG. 7 is a flowchart for a process of setting target voltage Vh* performed by control unit 2 shown in FIG. 1. It is to be noted that the process shown in this flowchart is invoked from a main routine and executed whenever certain time elapses or a prescribed condition is established.

With reference to FIG. 7, control unit 2 detects voltages Vb1, Vb2 of power storage devices 6-1, 6-2 by means of voltage sensors 12-1, 12-2, respectively (step S10). Then, control unit 2 obtains required voltages Vm1*, Vm2* of motor-generators 34-1, 34-2 from HV_ECU 4, and sets the maximum value among voltages Vb1, Vb2 and required voltages Vm1*, Vm2*, as target voltage Vh* of voltage Vh (step S20).

Subsequently, control unit 2 determines lower limit value Vth of target voltage Vh* based on voltages Vb1, Vb2, temperatures Tb1, Tb2, and required electric powers Pb1*, Pb2* of power storage devices 6-1, 6-2 (step S30). Specifically, control unit 2 determines lower limit value Vth in a range of a voltage that is higher than the maximum value of voltages Vb1, Vb2 and is not affected by the dead time provided for the converters, based on temperatures Tb1, Tb2 and required electric powers Pb1*, Pb2*, using a map or the like indicating the relationship between the temperature and the required electric power of the power storage device and the lower limit value of the target voltage as shown in FIGS. 5 and 6.

Next, control unit 2 determines whether or not target voltage Vh* set in step S20 is lower than lower limit value Vth (step S40). If control unit 2 determines that target voltage Vh* is lower than lower limit value Vth (YES in step S40), control unit 2 sets lower limit value Vth as target voltage Vh* (step S50).

As described above, in the present embodiment, lower limit value Vth is provided for target voltage Vh* of voltage Vh between main positive bus line MPL and main negative bus line MNL, and lower limit value Vth is set at a voltage level that is higher than the maximum one of voltages Vb1, Vb2 of power storage devices 6-1, 6-2 and is not affected by the dead time provided for converters 8-1, 8-2. If target voltage Vh* is lower than lower limit value Vth, lower limit value Vth is set as target voltage Vh*, avoiding low boost operation that causes target voltage Vh* to be substantially identical to voltages Vb1, Vb2. Therefore, according to the present embodiment, fluctuations of voltage Vh due to the influence of the dead time provided for converters 8-1, 8-2 can be prevented.

Further, in the present embodiment, lower limit value Vth is variably set in a range of a voltage that is higher than the maximum one of voltages Vb1, Vb2 and is not affected by the dead time, in accordance with temperatures Tb1, Tb2 and required electric powers Pb1*, Pb2* that affect voltages Vb1, Vb2, rather than being set to a constant high value. Therefore, according to the present embodiment, a reduction in efficiency of converters 8-1, 8-2 can be suppressed.

Although lower limit value Vth of target voltage Vh* is variably set based on the temperatures and the required electric powers of the power storage devices in the embodiment described above, lower limit value Vth may be variably set based on the currents and the SOCs of the power storage devices.

Figure 8:
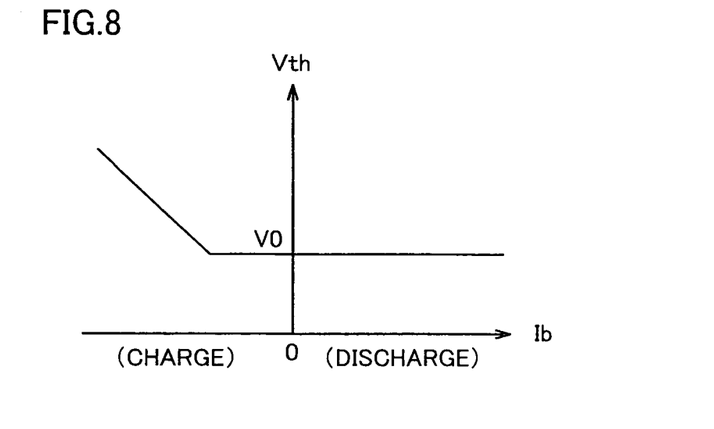
FIG. 8 is a view showing an exemplary relationship between the current of a power storage device and the lower limit value of the target voltage.

FIG. 8 is a view showing an exemplary relationship between the current of a power storage device and lower limit value Vth of target voltage Vh*. Referring to FIG. 8, lower limit value Vth is set to be higher with an increase in the charge current of the power storage device. It is to be noted that lower limit value Vth is variably set in a range not less than voltage V0 that is higher than the voltage of the power storage device and is not affected by the dead time.

Lower limit value Vth is variably set to be higher with an increase in the charge current of the power storage device, for the following reason. The greater the charge current to the power storage device is, the greater the voltage of the power storage device is increased by the internal resistance, and the higher the voltage of the power storage device is. Therefore, lower limit value Vth is set to be higher corresponding to an increase in the voltage of the power storage device with an increase in the charge current to the power storage device.

Figure 9:
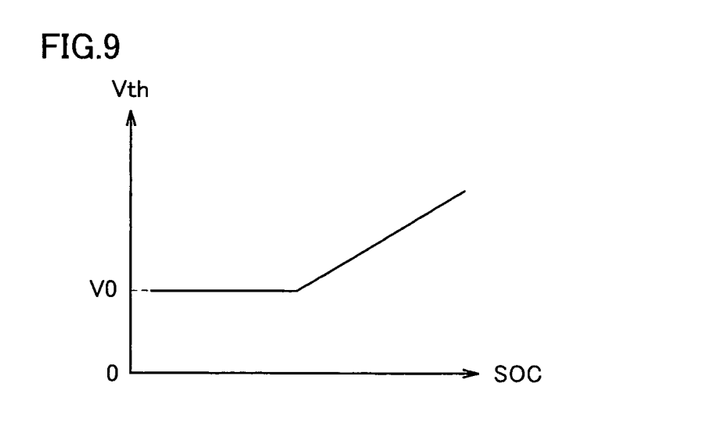
FIG. 9 is a view showing an exemplary relationship between the SOC of a power storage device and the lower limit value of the target voltage.

FIG. 9 is a view showing an exemplary relationship between the SOC of a power storage device and lower limit value Vth of target voltage Vh*. Referring to FIG. 9, lower limit value Vth is set to be higher with an increase in the SOC of the power storage device. It is to be noted that lower limit value Vth is variably set in the range not less than voltage V0 described above.

Lower limit value Vth is variably set to be higher with an increase in the SOC of the power storage device, for the following reason. There is a positive correlation between the SOC and an open circuit voltage (OCV) of the power storage device, and the higher the SOC of the power storage device is, the higher the voltage of the power storage device is. Therefore, lower limit value Vth is set to be higher corresponding to an increase in the voltage of the power storage device with an increase in the SOC of the power storage device.

Although converter 8-1 is subjected to voltage control (voltage feedback control) and converter 8-2 is subjected to current control (current feedback control) in the embodiment described above, converter 8-1 may be subjected to current control and converter 8-2 may be subjected to voltage control.

Further, although power supply system 1 includes two power storage devices 6-1, 6-2 and respectively corresponding converters 8-1, 8-2 in the embodiment described above, power supply system 1 may include more power storage devices and respectively corresponding converters.

It is to be noted that, in the above description, the control in control unit 2 is actually performed by a CPU (Central Processing Unit), and the CPU reads from a ROM (Read Only Memory) a program including the control structure shown in FIG. 4 and the steps of the flowchart shown in FIG. 7, executes the read program to perform the process in accordance with the control structure and the flowchart descried above. Therefore, the ROM is equivalent to a computer (CPU)-readable recording medium recording the program including the control structure shown in FIG. 4 and the steps of the flowchart shown in FIG. 7.

It is to be noted that, in the above description, drive force generation unit 3 corresponds to an embodiment of the "load device" in the present invention, and power storage devices 6-1, 6-2 correspond to an embodiment of the "plurality of power storage devices" in the present invention. Further, main positive bus line MPL and main negative bus line MNL correspond to an embodiment of the "power line" in the present invention, and converters 8-1, 8-2 correspond to an embodiment of the "plurality of converters" in the present invention. Furthermore, subtraction unit 56 and proportional-integral control unit 58 of control unit 2 correspond to an embodiment of the "voltage control unit" in the present invention.

It should be understood that the embodiment disclosed herein is illustrative and non-restrictive in every respect. The scope of the present invention is defined by the terms of the claims, rather than the description of the embodiment described above, and is intended to include any modifications within the scope and meaning equivalent to the terms of the claims.

The invention claimed is:

1. A power supply system capable of supplying/receiving electric power to/from a load device, comprising:
   a power line for supplying/receiving the electric power between the power supply system and said load device;
   a plurality of power storage devices that are chargeable/dischargeable;
   a plurality of converters corresponding to said plurality of power storage devices, and each configured to be capable of performing voltage conversion between the corresponding power storage device and said power line;
   a target voltage setting unit for setting a target voltage of said power line; and
   a voltage control unit for controlling a voltage of said power line to be said target voltage by controlling at least one of said plurality of converters, wherein:
   when said target voltage is lower than a target voltage lower limit value that is set higher than a maximum one of voltages of said plurality of power storage devices, said target voltage setting unit setting said target voltage lower limit value as said target voltage, and
   said target voltage lower limit value is set to a voltage that is not affected by a dead time to prevent a short circuit in upper and lower arms of said plurality of converters.

2. The power supply system according to claim 1, wherein said target voltage setting unit sets a maximum one of the voltages of said plurality of power storage devices and a required voltage of said load device as said target voltage, and, when the set target voltage is lower than said target voltage lower limit value, said target voltage setting unit sets said target voltage lower limit value as said target voltage.

3. The power supply system according to claim 1, wherein said target voltage lower limit value is variably set in accordance with states of said plurality of power storage devices.

4. The power supply system according to claim 3, wherein said target voltage lower limit value is set to be higher with a decrease in temperatures of said plurality of power storage devices.

5. The power supply system according to claim 3, wherein said target voltage lower limit value is set to be higher with an increase in charge power to said plurality of power storage devices.

6. The power supply system according to claim 3, wherein said target voltage lower limit value is set to be higher with an increase in charge current to said plurality of power storage devices.

7. The power supply system according to claim 3, wherein said target voltage lower limit value is set to be higher with an increase in state quantity indicating a state of charge of said plurality of power storage devices.

8. A vehicle, comprising:
   the power supply system according to claim 1; and
   a drive force generation unit for receiving the electric power supplied from said power supply system and generating drive force for the vehicle.

9. A control method for a power supply system capable of supplying/receiving electric power to/from a load device, said power supply system including:
   a power line for supplying/receiving the electric power between said power supply system and said load device;
   a plurality of power storage devices that are chargeable/dischargeable; and a plurality of converters corresponding to said plurality of power storage devices, and each configured to be capable of performing voltage conversion between the corresponding power storage device and said power line;

said control method comprising the steps of:

setting a target voltage of said power line;

determining whether or not said target voltage is lower than a target voltage lower limit value that is set higher than a maximum one of voltages of said plurality of power storage devices;

setting said target voltage lower limit value as said target voltage when said target voltage is determined to be lower than said target voltage lower limit value; and controlling a voltage of said power line to be said target voltage by controlling at least one of said plurality of converters, wherein said target voltage lower limit value is set to a voltage that is not affected by a dead time to prevent a short circuit in upper and lower arms of said plurality of converters.

10. The control method for a power supply system according to claim 9, wherein, in said step of setting a target voltage, a maximum one of the voltages of said plurality of power storage devices and a required voltage of said load device is set as said target voltage.

11. The control method for a power supply system according to claim 9, wherein said target voltage lower limit value is variably set in accordance with states of said plurality of power storage devices.

12. The control method for a power supply system according to claim 11, wherein said target voltage lower limit value is set to be higher with a decrease in temperatures of said plurality of power storage devices.

13. The control method for a power supply system according to claim 11, wherein said target voltage lower limit value is set to be higher with an increase in charge power to said plurality of power storage devices.

14. The control method for a power supply system according to claim 11, wherein said target voltage lower limit value is set to be higher with an increase in charge current to said plurality of power storage devices.

15. The control method for a power supply system according to claim 11, wherein said target voltage lower limit value is set to be higher with an increase in state quantity indicating a state of charge of said plurality of power storage devices.

16. A computer-readable recording medium recording a program for causing a computer to execute the control method for a power supply system according to claim 9.

17. The power supply system according to claim 1, further comprising a current control unit for controlling a current of one of said plurality of converters to be a target current by controlling one of said plurality of converters.

* * * * *